(12) United States Patent
Vetrovec (10) Patent No.: US 7,685,819 B2
(45) Date of Patent: Mar. 30, 2010

(54) TURBOCHARGED INTERNAL COMBUSTION ENGINE SYSTEM

(75) Inventor: Jan Vetrovec, Larkspur, CO (US)

(73) Assignee: Aqwest LLC, Larkspur, CO (US)

( * ) Notice: Subject to any disclaimer, the term of this patent is extended or adjusted under 35 U.S.C. 154(b) by 0 days.

(21) Appl. No.: 11/809,135

(22) Filed: May 31, 2007

(65) Prior Publication Data

US 2008/0133110 A1    Jun. 5, 2008

Related U.S. Application Data (63) Continuation-in-part of application No. 11/655,441, filed on Jan. 19, 2007, and a continuation-in-part of application No. 11/443,424, filed on May 29, 2006, and a continuation-in-part of application No. 11/389,795, filed on Mar. 27, 2006.

(51) Int. Cl.
  *F02B 33/44* (2006.01)
  *F02B 9/04* (2006.01)
  *F02M 15/00* (2006.01)
  *F17D 1/04* (2006.01)

(52) U.S. Cl. .......... 60/611; 60/605.1; 123/559.1; 123/540; 123/541; 123/542

(58) Field of Classification Search ............ 60/611, 60/605.1; 123/559.1, 540, 541, 542, 585, 123/590; 62/5; F02B 9/04, 37/00; F17D 1/04
See application file for complete search history.

(56) References Cited

U.S. PATENT DOCUMENTS

| | | | | |
|---|---|---|---|---|
| 2,790,310 A | * | 4/1957 | Green ........................... | 62/5 |
| 2,870,611 A | * | 1/1959 | Hendal .......................... | 62/5 |
| 2,907,174 A | * | 10/1959 | Hendal .......................... | 62/5 |
| 2,965,083 A | * | 12/1960 | Percival ....................... | 123/559.1 |
| 2,983,267 A | * | 5/1961 | Percival ....................... | 123/559.1 |
| 3,020,901 A | | 2/1962 | Cook ............................. | 123/559.1 |

(Continued)

FOREIGN PATENT DOCUMENTS

DE    3718579 A1 *  12/1988

(Continued)

OTHER PUBLICATIONS

S.A. Skebe et al.,"Parameter Effects on Mixer-Ejector Pumping Perform.," paper No. AIAA-88-0188, publ. by AIAA, Washington, DC, Jan. 11, 1988.

(Continued)

*Primary Examiner*—Thai Ba Trieu (57) ABSTRACT

The present invention relates to a turbocharged internal combustion engine (ICE) system having fast response to increased power demand and reduced response time lag. The system includes a vortex tube for delivering cold air into the turbocharger compressor where it may be used to cool the impeller, and/or accelerate the impeller rotational speed, and/or favorably shift the compressor surge line at low speeds and high loads. Cold air from the vortex tube may be also used to operate an ejector pump in the intake duct which further compresses intake air and increases engine charge weight during periods of high power demand. In addition to increasing engine output power, delivery of cold air into engine intake also reduces engine pre-ignition (knocking) thereby reducing emissions. The invention also relates to a method for operating a turbocharged internal combustion engine.

12 Claims, 7 Drawing Sheets

U.S. PATENT DOCUMENTS

| | | | | |
|---|---|---|---|---|
| 3,173,273 | A | * | 3/1965 | Fulton .............................. 62/5 |
| 3,190,068 | A | | 6/1965 | Williams et al. .............. 60/611 |
| 3,208,229 | A | * | 9/1965 | Fulton .............................. 62/5 |
| 3,462,071 | A | * | 8/1969 | Garve .......................... 60/611 |
| 3,546,891 | A | * | 12/1970 | Fekete ............................. 62/5 |
| 3,673,796 | A | | 7/1972 | Weich et al. ................... 60/611 |
| 4,612,646 | A | | 9/1986 | Zerr ........................... 372/58 |
| 4,696,165 | A | * | 9/1987 | Bucher ........................ 60/611 |
| 4,840,164 | A | * | 6/1989 | Parsons ................... 123/559.1 |
| 5,299,547 | A | | 4/1994 | Michimasa ................... 60/611 |
| 5,461,860 | A | | 10/1995 | Schegk ........................ 60/611 |
| 5,558,069 | A | * | 9/1996 | Stay ............................ 123/541 |
| 5,561,982 | A | | 10/1996 | Tunkel et al. .................... 62/5 |
| 5,911,740 | A | | 6/1999 | Tunkel et al. .................... 62/5 |
| 6,247,460 | B1 | | 6/2001 | Lindberg et al. .............. 60/599 |
| 6,289,679 | B1 | | 9/2001 | Tunkel et al. .................... 62/5 |
| 6,813,887 | B2 | | 11/2004 | Sumser et al. ................ 60/611 |
| 6,895,752 | B1 | | 5/2005 | Holman ..................... 60/605.2 |
| 6,922,997 | B1 | | 8/2005 | Larson et al. ................. 60/611 |
| 7,021,058 | B2 | | 4/2006 | Scheinert ..................... 60/611 |
| 7,076,952 | B1 | | 7/2006 | Vetrovec .................... 60/605.1 |
| 7,198,036 | B2 | * | 4/2007 | White ......................... 123/542 |
| 7,305,834 | B2 | * | 12/2007 | Bhatti ............................. 62/5 |
| 2005/0022526 | A1 | * | 2/2005 | Scheinert ..................... 60/611 |
| 2005/0045033 | A1 | * | 3/2005 | Nicol et al. ................... 95/269 |
| 2006/0168958 | A1 | | 8/2006 | Vetrovec ....................... 60/599 |
| 2007/0044779 | A1 | * | 3/2007 | Green ......................... 123/585 |
| 2008/0179039 | A1 | * | 7/2008 | Moilala et al. ................. 165/4 |
| 2008/0209914 | A1 | * | 9/2008 | De Wergifosse et al. ......... 62/5 |

FOREIGN PATENT DOCUMENTS

| | | | |
|---|---|---|---|
| JP | 5756623 | A | 4/1982 |
| JP | 57059022 | A | 4/1982 |
| JP | 57210154 | A | 12/1982 |
| JP | 59101539 | A * | 6/1984 |
| JP | 2002066724 | A * | 3/2002 |
| KR | 2004050326 | A * | 6/2004 |
| KR | 2005070395 | A * | 7/2005 |
| KR | 759516 | B1 * | 10/2007 |
| RU | 2175739 | C1 * | 11/2001 |
| SU | 2090774 | C1 * | 9/1977 |
| SU | 1031672 | A * | 7/1983 |

OTHER PUBLICATIONS

T.G. Tillman et al., "Supersonic Nozzle Mixer Ejector," J. of Propulsion and Power, vol. 8, No. 2, pp. 513-519, Mar.-Apr. 1992.

A.K. Narayanan et al."Supersonic-Ejector Characterist. Using Petal Nozzle," J. of Prop. and Power, vol. 10, No. 5, pp. 742-744, Sep.-Oct. 1994.

B.K. Ahlborn et al, "The Vortex Tube as a Classic Thermodynamic Refrig. Cycle," J. of Appl Phys., vol. 88, No. 6, pp. 3645-3653, Sep. 15, 2000.

B.R. Belostotskiy et al. "Vortex-Flow Cooled Laser," published in Soviet Jour. of Optical. Technol, vol. 35, No. 1, pp. 450-452, Jan.-Feb. 1968.

N. Heintz et al. "An Approach to Torque Based Engine Management Systems," SAE Paper No. 2001-01-0269, 2001.

T. Jaine et al., "High Frequency IMEP Estimation and Filtering for Torque Based SI Engine Control," SAE Paper No. 2002-01-1276, 2002.

W. Presz et al., "Short Efficient Ejector Systems," paper No. AIAA-87-1837, publ. by AIAA, Washington, DC, Jan. 11, 1987.

* cited by examiner

TURBOCHARGED INTERNAL COMBUSTION ENGINE SYSTEM

CROSS-REFERENCE TO RELATED APPLICATIONS:

This patent application is a continuation-in-part patent application of: U.S. Ser. No. 11/655,441 filed on Jan. 19, 2007 and entitled SUPERCHARGED INTERNAL COMBUSTION ENGINE SYSTEM; U.S. Ser. No. 11/443,424 filed on May 29, 2006 and entitled SUPERCHARGED INTERNAL COMBUSTION ENGINE; and U.S. Ser. No. 11/389,795 filed on Mar. 27, 2006 and entitled SUPERCHARGED INTERNAL COMBUSTION ENGINE, the entire contents of all of which are hereby expressly incorporated by reference.

FIELD OF THE INVENTION

This invention relates generally to supercharged internal combustion engines and, more particularly, to compressors for superchargers capable of fast response to engine demand and delivering high boost during low engine speed.

BACKGROUND OF THE INVENTION

Turbocharging of Internal Combustion Engines: One of the long-term goals of the automotive manufacturers is to reduce fuel consumption and emissions of modern automotive vehicles powered by internal combustion engines (ICE) while increasing engine efficiency. One approach to reaching this goal is reducing the ICE displacement. However, smaller engines having reduced swept volume typically exhibit insufficient power and torque when operating with normal aspiration. This problem can be remedied by supercharging. It is well known in the art that ICE power output increases with increased weight of air ingested into engine cylinders and available for combustion. Weight of intake air ingested into engine cylinders can be increased by either (1) increasing the pressure of intake air beyond what can be accomplished by natural aspiration or by (2) reducing the temperature of intake air or by (3) a combination of (1) and (2). A supercharged ICE, therefore, receives combustion air with higher density than a normally aspirated ICE. As a result, supercharging allows generating increased power from an engine of a given displacement or, generating a given power output from an engine of smaller size, weight, cost, and emissions. In addition, reduced charge temperature is known to reduce ICE emissions by decreasing charge pre-ignition also known as knocking.

One commonly used type of a supercharger is the exhaust-gas turbocharger which typically includes a turbine and a centrifugal compressor on a common shaft. The turbine is rotated by exhaust gases from the engine and spins the compressor. The compressor receives intake air, compresses it, and supplies it to ICE combustion chamber(s). Turbochargers provide the advantages of relatively smooth transition from natural aspiration to supercharged operation while utilizing some of the residual energy of hot exhaust gas, which would otherwise be largely wasted. The challenges of constructing a turbocharged ICE include: 1) reducing as much as possible the response time lag, 2) broadening of the compressor working regime, and 3) reducing the exposure of compressor impeller to high temperatures and stresses. Information relevant to attempts to overcome these challenges and the disadvantages of such attempts are described below.

A turbocharged ICE is susceptible to a slow response time known as the "turbo lag" which is caused by the low pressure and low quantity of exhaust gases that are available to operate the turbine at low engine speeds. This translates to insufficient quantity of intake air delivered to the engine and results in insufficient torque at low engine speeds. The turbo-lag problem may be corrected in-part by the use of a variable nozzle turbine, which alters the cross-sectional area through which the exhaust gas flows in accordance with engine speed. However, this approach adds complexity and cost while reducing reliability. Another approach to reducing the turbo lag may use one or more jets of air injected onto the compressor wheel of a turbocharger as disclosed, for example, by Williams et al. in U.S. Pat. No. 3,190,068. Such air jets may be directed generally onto the vanes of the compressor wheel so as to transfer a part of their momentum to the wheel and thus accelerate the rotational speed of the compressor. Air injected in this manner becomes a part of the intake air ingested by the engine. Yet another approach may use air jets injected into the diffuser part of the compressor as disclosed by Schegk in U.S. Pat. No. 5,461,860, the entire contents of which is hereby expressly incorporated by reference. Neither said Williams nor said Schegk disclose injection of cold air into compressor housing or compressor components.

Performance of a turbocharger compressor is often described in terms of a characteristic diagram which defines the working range of the compressor by plotting the ratio of compressor output pressure to its input pressure as a function of the air mass throughput through the compressor. The compressor working range in the characteristic diagram is limited by a so-called "surge limit." The surge limit represents a characteristic curve which curbs the output of the compressor in the regime of combined low mass throughputs and a high output pressure. This regime corresponds to an ICE operating at high load and a low rotational speed. With the compressor operating close to the surge limit, local zones of detached flow may be formed, which may result in periodic pulsation of the flow, change in the flow direction and acoustic noise. To increase the operating range of the compressor in the regime of high-loads and low-speeds it is desirable to shift the surge limit towards lower mass throughputs. The surge limit may be favorably shifted by means of characteristic-diagram stabilization measures such as a bypass which bridges compressor outflow port and inflow port. In particular, the bypass returns part of the compressor output flow into the compressor the inflow port and directs it on the compressor-impeller inlet edge as disclosed, for example, by Sumser et al. in U.S. Pat. No. 6,813,887 the entire contents of which is hereby expressly incorporated by reference. If the compressor operates close to the surge limit, the bypass allows recirculation of a predetermined portion of the compressor output stream back to the compressor inflow port. Sumser also discloses an ICE having an auxiliary air feed which supplies auxiliary air at ambient temperature through an injection opening in a wall of the compressor inlet and directs it into the flow-facing region of the compressor wheel. Auxiliary air injected in this manner influences the surge limit in favor of a regime with lower mass throughputs and high compressor pressure ratio. As a result, compressor working range is broadened. Furthermore, injected auxiliary air beneficially drives the compressor impeller, thereby helping the turbocharger to accelerate to its normal operating speed range. As a result, high charging pressures may be attained more rapidly, the undesirable turbo lag is reduced, and the turbocharged ICE may accelerate from low speed in a rapid, smooth manner. However, said Sumser does not disclose injection of cold air into compressor housing or compressor components.

Experience shows that when turbocharger delivers high supercharging pressures, the compressor components experience high thermal loading. This may necessitate that such components are either fabricated from high-temperature materials, which are costly and difficult to machine or that such components are actively cooled, which has limited effect and adds complexity. This problem may be alleviated by cooling the air recirculated via a bypass from the compressor outflow port back to the compressor inflow port as disclosed by Scheinert in U.S. Pat. No. 7,021,058 the entire contents of which is hereby expressly incorporated by reference. In particular, Scheinert discloses a temperature reducing unit comprising a diffuser in a form of an expansion duct employed to cool the recirculated air before it is directed onto compressor wheel. However, temperature reduction achievable by Scheinert's temperature reducing unit is very limited.

Figure 1:
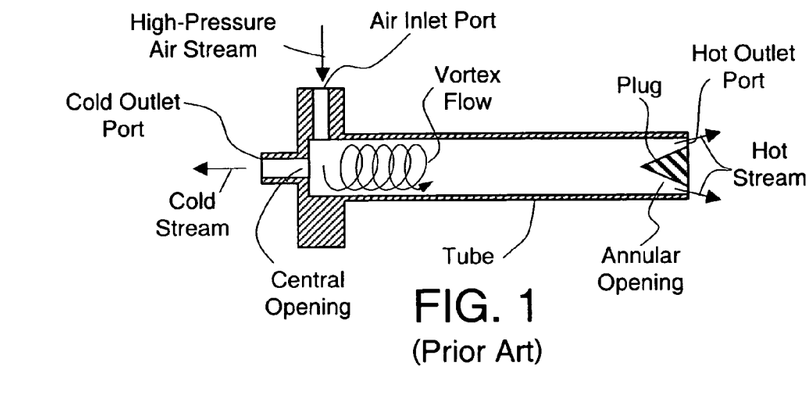
FIG. 1 is a cross-sectional view of a vortex tube of prior art suitable for concurrent generation of hot and cold output streams.
Figure 2A:
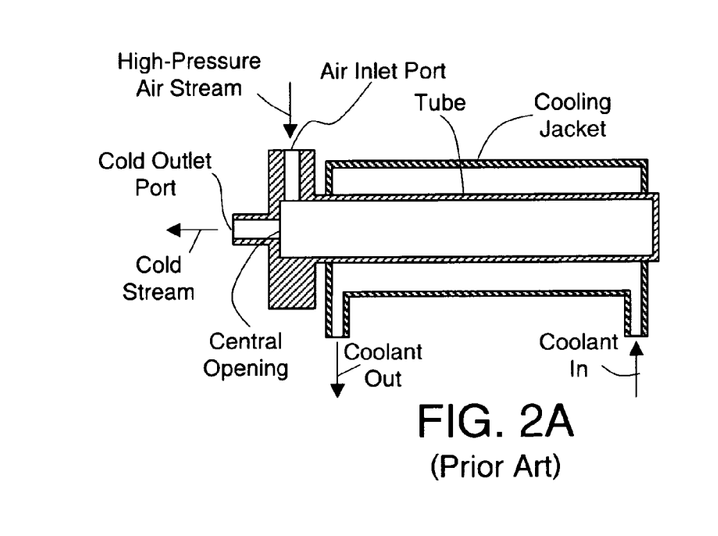
FIG. 2A is a cross-sectional view of a vortex tube of prior art suitable for generation of cold output stream only.
Figure 2B:
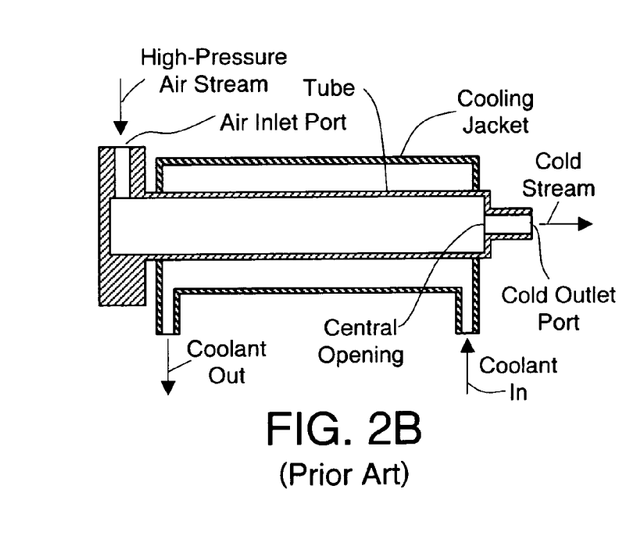
FIG. 2B is a cross-sectional view of an alternative vortex tube of prior art suitabled for generation of cold output stream only.

Vortex Tube for Cooling of ICE Intake Flow: Vortex tube is a well known cooling device in the art of refrigeration. Traditional vortex tube comprises a slender tube having one end closed except for a small a central opening and the other end plugged except for an annular opening which may be adjusted in size for flow control, see FIG. 1. A stream of high-pressure air (or other suitable gas) is injected through an inlet port tangentially into the tube in the proximity of the central opening. Resulting vortex flow pattern inside the tube separates the input air stream into a relatively hot air stream which exits through the annular opening and a relatively cold air stream which exits through the central opening and the cold outlet port. Relative flow rates and temperatures of these two streams are typically adjustable by controlling the flow of the hot exhaust stream. See, for example, article entitled "The Vortex Tube as a Classic Thermodynamic Refrigeration Cycle," by B. K. Ahlbom et al., published in Journal of Applied Physics, Volume 88, Number 6, pp. 3645-3653, Sep. 15, 2000. A variant of the traditional vortex tube suitable for generating only a cold output stream can be produced by entirely closing one of the tube ends combined with active cooling of the tube exterior surface such as shown in FIGS. 2A and 2B and disclosed, for example, by Zerr in U.S. Pat. No. 4,612,646. Suitable cooling may be provided by a cooling jacket which may envelop the exterior surface of the tube. Suitable coolants may be provided in liquid or gaseous form. The exterior surface of the tube can be further provided with surface extensions to facilitate improved heat transfer as disclosed, for example, by Tunkel et al. in U.S. Pat. No. 5,911, 740.

Lindberg et al. in U.S. Pat. No. 6,247,460 discloses an ICE having a vortex tube for cooling intake air. Lindbergh's vortex tube generates both cold and hot outputs with only the cold output supplied to ICE intake. All of the intake air flows through the vortex tube at all times. When used on a supercharged ICE, the pressure drop of intake air inside the vortex tube robs the ICE of the pressure boost provided by the supercharger and wastes much of the supercharger output into vortex tube hot flow. Similarly, when used on a naturally aspirated ICE, the vortex tube impedes intake air flow thereby significantly reducing the intake air pressure. In each case the benefit of providing cooler air to the ICE is accomplished at the expense of reducing the intake air pressure. In particular, data of some vortex tube manufacturers suggests that the pressure ratio between vortex tube inlet port and its cold outlet port should be at least 2.4. See, for example, Catalog No. 21, page 102, published by Exair Corporation, Cincinnati, Ohio. Since cooling of the intake air and reducing its pressure have opposite effects on air density, the net benefit of Lindberg's apparatus, if any, is rather limited. Holman et al. in the U.S. Pat. No. 6,895,752 discloses a turbocharged ICE with an exhaust gas recirculation (EGR) system wherein ICE exhaust is directed to a vortex tube to generate a cooler flow and a hoter flow. The cooler flow is directed to ICE intake to recirculate part of the exhaust gas while the hot flow may be exhausted from the ICE in a conventional manner.

In summary, prior art does not teach a turbocharged ICE system that is effective during the conditions of high torque and low engine speed, has a fast response to power demand, is simple, economical, avoids exposing compressor components to excessive temperatures, and reduces susceptibility to charge pre-ignition. Furthermore, the prior art does not teach a turbocharged ICE system where turbocharger operation is augmented by injection of cold air from a vortex tube. Moreover, the prior art does not teach a turbocharged ICE system where turbocharger compressor is cooled by cold air from a vortex tube. It is against this background that the significant improvements and advancements of the present invention have taken place.

SUMMARY OF THE INVENTION

The present invention provides a turbocharged ICE system wherein the turbocharger assembly comprises a vortex tube that supplies cold, dense air to the ICE intake. When such cold air is supplied to a turbocharger compressor in the ICE intake, it may beneficially increase the compressor surge limit, cool the compressor blades, and accelerate the compressor speed. Faster compressor speed is conducive to generating higher charge pressure. In addition to increasing the charge pressure, injection of cold dense air may cool the engine intake air, which may further increase the weight of ICE charge and thus enable the ICE to produce more output power. Injection of cold air in the form of high-velocity jet onto compressor impeller may also enhance transfer of kinetic energy from the jet to the impeller and promote further increase in impeller speed. Cold air from the vortex tube may be also injected into the flow of intake air downstream of the compressor impeller either into the compressor diffuser or into the engine intake duct. In particular, cold air may be injected into the intake duct as one or more high velocity jets arranged to entrain and pump engine intake air, thereby increasing charge air density both by compression and by cooling. Suitable cold air injector may be a nozzle adapted for subsonic, sonic, or supersonic flow regime. Furthermore, the injector in the intake duct may be a driving nozzle which may also include lobes to enhance mixing. The compressed air for operation of the vortex tube may be obtained from the turbocharger compressor output flow or it may it may be supplied from an auxiliary air source. Suitable auxiliary air source may include an auxiliary compressor and/or an air tank.

The vortex tube for use with the subject invention is preferably adapted for generation of cold output stream only. Such a vortex tube may include a cooling jacket or a heat exchanger which transfers heat from the vortex tube to either liquid coolant, gas coolant, air, ballast structure, or a phase change material (PCM). The turbocharged ICE system of the subject invention may further include means for regulating the flow and/or pressure of high-pressure air fed to the vortex tube and thereby regulating the air cooling action. In addition, the turbocharged ICE system may include means for sensing ICE power demand and appropriately controlling the operation of the vortex tube and the turbocharger to supercharge the ICE in response to demand.

In one preferred embodiment of the present invention particularly useful for transient operation during times of increasing ICE power output, compressed air from an auxiliary compressed air source is cooled in a vortex tube and injected into the housing of a turbocharger compressor. In particular, cold air may be injected into the flow facing region of the compressor impeller, and/or onto the edge of impelled blade, and/or into the compressor diffuser. This embodiment is particularly useful for improving the performance of a compressor during periods of increasing ICE power demand. In another preferred embodiment of the present invention, a portion of the supercharging compressor output compressed air stream is cooled in a vortex tube and injected back into the housing of a turbocharger compressor. This embodiment is particularly suitable for turbochargers having high compression ratio (including multiple stage turbochargers) where it is useful for substantially continuous improvement of compressor performance such as may be desired during generally continuous operation. In yet another embodiment, compressed air from an auxiliary compressed air source is cooled in a vortex tube and injected into the engine intake duct downstream of the compressor. Cold air injected into the intake duct may be mixed with intake air from the exhaust-gas turbocharger. The resulting intake air mixture is colder and denser, which results in increased weight of ICE charge. Furthermore, the injector may be a driving nozzle arranged to pump intake air into the engine combustion chamber. In a still another embodiment, compressed air from an auxiliary compressed air source is cooled in a vortex tube and it is used to operate an ejector arranged to pump intake air at times of increasing ICE load. When the ejector is not needed, intake air may bypass the ejector through a bypass duct. The auxiliary compressed air source may also include an auxiliary compressor and/or an air tank for providing compressed air to the vortex tube. The auxiliary compressor may be driven by the ICE output shaft, vehicle drive train, an electric motor, or by other suitable means. The auxiliary compressor may be adapted to be preferentially engaged during periods of low ICE load and/or to recover kinetic energy during vehicle deceleration. A variant of the invention includes a vortex tube having a cooling jacket filled with PCM. During vortex tube operation, high-temperature air generated inside the vortex tube is cooled by transferring its heat into the PCM. Between supercharging events, heat is removed from the PCM and transferred to liquid coolant, gas coolant, or air. Another variant of the vortex tube may include a provision for storing heat as a sensible heat in vortex tube ballast structure.

Accordingly, it is an object of the present invention to provide a turbocharged ICE system which may generate a high volume of intake air flow at high pressure during the conditions of high load demand and relatively low engine speeds. The turbocharged ICE system of the present invention is simple, lightweight, and inexpensive to manufacture which makes it suitable for large volume production of automotive vehicles.

It is another object of the invention to provide a turbocharger assembly that has a fast response to output demand conditions.

It is still another object of the invention to reduce the temperature of ICE intake air delivered by a turbocharger.

It is yet another object of the invention to cool a supercharger compressor especially during conditions of high loading.

It is yet further object of the invention to pump intake air into an internal combustion engine.

It is a further object of the invention to beneficially broaden the operating range of a turbocharger compressor.

It is still further object of the invention to beneficially shift the surge limit in a turbocharger compressor at times of high load and low speed of associated engine.

These and other objects of the present invention will become apparent upon a reading of the following specification and claims.

DETAILED DESCRIPTION OF THE PREFERRED EMBODIMENTS

Selected embodiments of the present invention will now be explained with reference to drawings. In the drawings, identical components are provided with identical reference symbols. It will be apparent to those skilled in the art from this disclosure that the following descriptions of the embodiments of the present invention are merely exemplary in nature and are in no way intended to limit the invention, its application, or uses.

Figure 3:
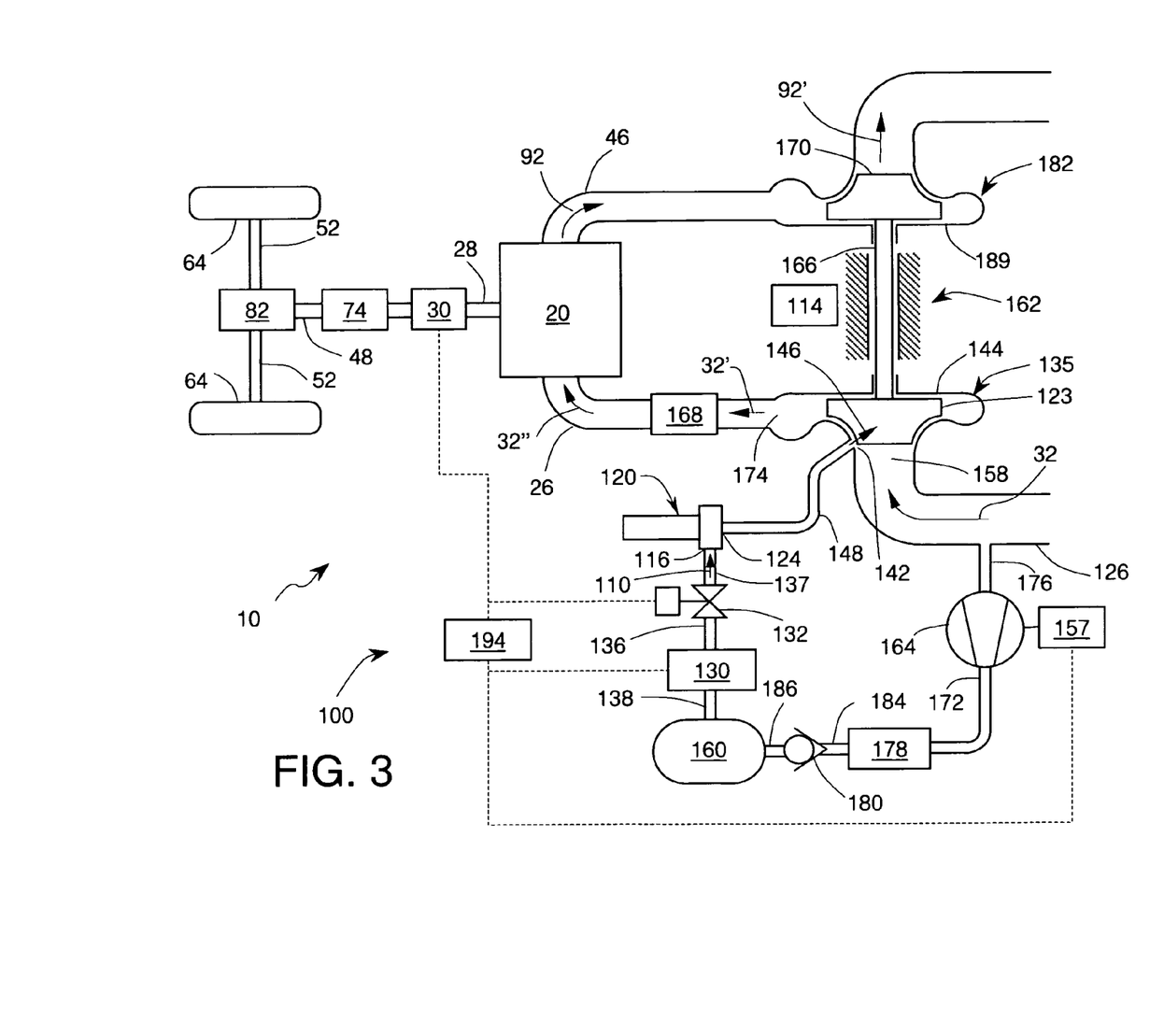
FIG. 3 is a schematic view of a turbocharged ICE system in accordance with a one embodiment of the subject invention.

Referring to FIG. 3, there is shown a turbocharged internal combustion engine (ICE) system 10 in accordance with one embodiment of the subject invention. The ICE system 10 comprises an ICE 20 and a turbocharger assembly 100. The ICE 20 has at least one combustion chamber fluidly coupled to an intake duct 26 to receive intake air therefrom and to an exhaust duct 46 to discharge exhaust gases thereinto. The type of ICE 20 may be either a compression ignition (diesel), a fuel injected spark ignition, carbureted spark ignition, or homogeneous charge compression ignition (HCCI) also known as controlled auto-ignition (CAI). Furthermore, the ICE 20 may also include an output shaft 28 and a torque sensor 30 for sensing ICE output torque. If the ICE system 10 is installed in an automotive vehicle, the output shaft 28 may provide power to a transmission 74, which in turn, may spin a drive shaft 48 to operate vehicle wheels 64 via differential 82 and axle 52 as is commonly practiced in the art.

The turbocharger assembly 100 comprises an exhaust gas turbocharger 162, a vortex tube 120, a high-pressure air supply line 138, control valve 132, pressure regulator 130, interconnecting lines 136 and 137, and an air feed line 148. The exhaust-gas turbocharger 162 further comprises a compressor 135 having an impeller 123 inside a compressor housing 144 and a turbine 182 having a turbine wheel 170 inside a turbine housing 188. The impeller 123 and the turbine wheel 170 are mounted on a common shaft 166. The turbine 182 is fluidly connected to the exhaust duct 46 and adapted to receive therethrough exhaust gases from the ICE 20 to spin the turbine wheel 170. The compressor housing 144 has an inflow port 158 fluidly connected to inflow duct 126 and an outflow port 174 fluidly connected to intake duct 26. The compressor 135 is adapted to receive intake air at one pressure through inflow port 158, to compress it to a higher pressure, and to deliver compressed intake air through outflow port 174 into the intake duct 26 and therethrough to the ICE 20. The turbocharger assembly 100 may also include an intercooler 168 installed in the intake duct 26 to cool the intake air prior to delivery to the ICE 20. The turbocharger assembly 100 may also include a speed sensor 114 for sensing rotational speed of the turbocharger 162. The line 138 is fluidly connected to an auxiliary source of compressed air which may be external to the ICE system 10. External auxiliary source of compressed air may be an existing supply of compressed air in vehicles such as trucks, buses, earth moving equipment, and utility vehicles. Such an external auxiliary source of compressed air may include a conventional reciprocating or rotary type compressor, or the compressed air may be generated in ICE cylinders during vehicle braking, as for example, disclosed by Larson et al. in U.S. Pat. No. 6,922,997. If an external auxiliary source of compressed air is not used, the turbocharger assembly 100 may also include an auxiliary compressor 164, compressor inlet line 176, aftercooler 178, check valve 180, air tank 160, and interconnecting lines 172, 184, and 186.

The auxiliary compressor 164 may be of any suitable type and it may have one or more stages to obtain a desired level of compression. Suction port of the auxiliary compressor 164 is fluidly coupled by the inlet line 176 to the intake duct 126 and it is adapted for drawing a portion of intake air therefrom. The auxiliary compressor 164 is preferably driven mechanically, hydraulically or by other suitable means. For example, the auxiliary compressor 164 may be driven mechanically either from the output shaft 28, or the crankshaft of the ICE 20, or from the vehicle drive shaft 48. Suitable mechanical means may include 1) direct coupling and 2) a system of belt and pulleys. Suitable mechanical means may also comprise a clutch 157 or an off-loader valve (not shown) that allows engaging the compressor 164 in accordance with predetermined conditions as it will be described below. Alternatively, the auxiliary compressor 164 may be driven by an electric motor. Discharge port of the auxiliary compressor 164 is fluidly coupled to the air tank 160 via the aftercooler 178, the check valve 180 and the interconnecting lines 172, 184 and 186.

The aftercooler 178 may be of the same general type used in conventional compressed air systems to remove the heat of compression from the air downstream of a compressor. The aftercooler 178 may be cooled by ambient air or by ICE coolant or other suitable means. The check valve 180 prevents a backflow of high-pressure air from the air tank 160 into the compressor 164 when the compressor is not operating. The line 184 may also include a water separator to remove water condensate from cooled air flow. The design and choice of materials for the air tank 160 are preferably selected to reduce the likelihood of tank rupture in the event of vehicle collision and/or fire. The air tank 160 may also include a pressure sensor which may be used to determine the amount of air stored. This information may be used in controlling the operation of the auxiliary compressor 164 of turbocharger assembly 100, and it may be also made available to the operator of an associated automotive vehicle.

The pressure regulator 130 is fluidly connected to the air tank 160 by means of the high-pressure line 138. Preferably, the pressure regulator 130 is remotely controllable in a manner that allows remotely controlling the pressure level in the line 136. Suitable pressure regulators that are remotely controllable either electrically, pneumatically, hydraulically, or mechanically are available commercially. The control valve 132 is fluidly connected to the pressure regulator 130 by means of the line 136 and to the inlet port 116 of vortex tube 120 by means of the line 137. The control valve 132 may be of on/off type and preferably have a very low flow impedance. Alternatively, the control valve 132 may be adapted for substantially smooth regulation of mass flow rate of compressed air in which case the pressure regulator 130 may become unnecessary.

The vortex tube 120 is preferably of the type adapted for generation of cold air only such as shown in FIGS. 2A and 2B and described in connection therewith. The vortex tube 120 may have a cooling jacket (see FIGS. 2A and 2B) which may be cooled by ICE coolant, or by ambient air, or by other suitable means. If ICE coolant is used, it is preferably supplied at a temperature between 5 and 30 degrees Centigrade. Preferably, the body of the vortex tube 120 is maintained at a temperature above zero degrees Centigrade to prevent moisture contained in the air entering the tube from freezing onto tube walls. The design of vortex tube 120 may also include a provision to reduce susceptibility to plugging by ice formed from the residual moisture in the inlet air. Suitable non-freezing vortex tube has been disclosed by Tunkel at al. in U.S. Pat. No. 6,289,679. The inlet port 116 of the vortex tube 120 is fluidly connected to the air tank 160 via the pressure regulator 130, valve 132, and the interconnecting lines 136, 137, and 138. The cold outlet 124 port of the vortex tube 120 is fluidly connected by the air feed line 148 to the compressor housing 144. The compressor housing 144 is adapted to receive cold air from the feed line 148 and inject it as a jet 146 into the housing 144 via one or more injectors 142. An alternative vortex tube for use with the subject invention may have a conventional design for concurrent generation of hot and cold outlet stream such as shown in FIG. 1 and described in connection therewith. In this case, the hot outlet stream may be released from the vortex tube through an appropriate flow impeding device (such as a control valve) so that the cold and hot outlet streams are desirably balanced in volume and a desired cold stream temperature and flow rate are obtained. The ICE system 10 preferably includes an electronic control unit (ECU) 194. Suitable ECU may be comprised of a central processing unit, a read-only memory, random access memory, input and output ports, and the like. The ECU 194 may be configured to receive signals from sensors in the ICE system 10, to determine whether certain predetermined conditions exist based on the measured parameters and generate signals to control the operation of the turbocharger assembly 100.

Figure 4A:
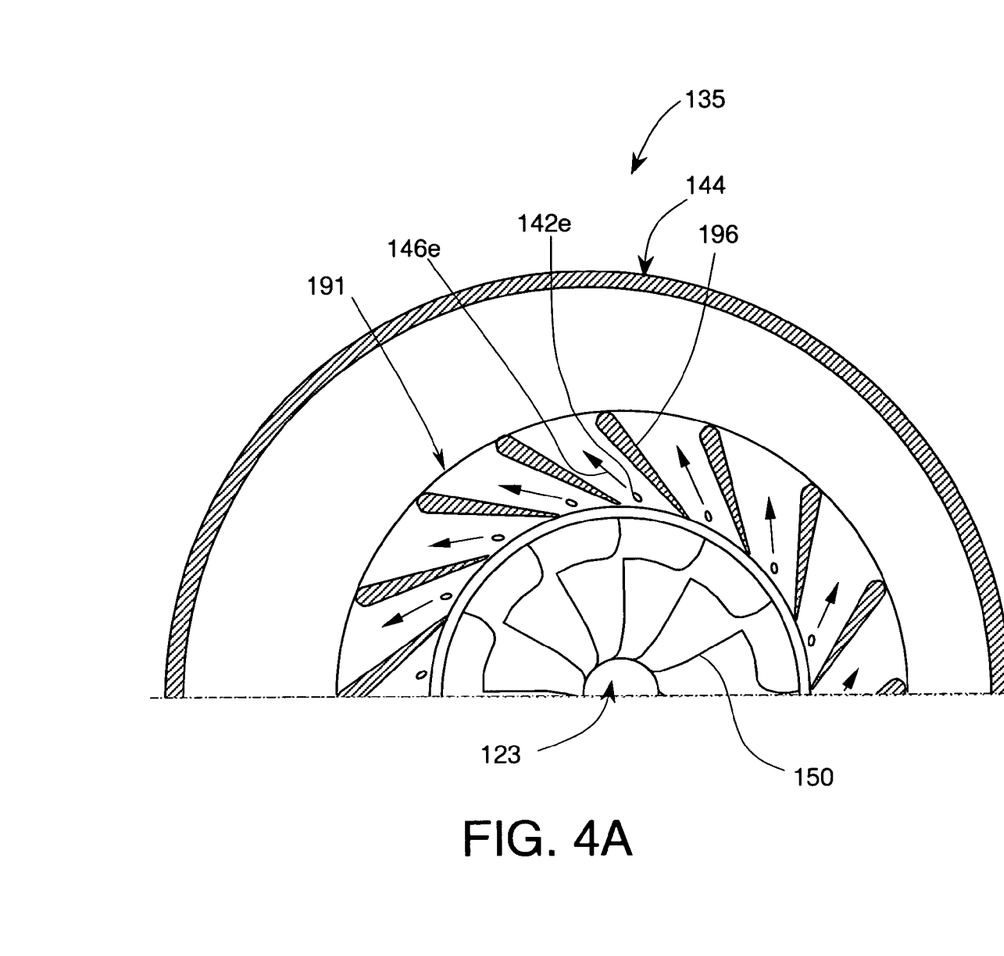
FIG. 4A is a cross-sectional view of a centrifugal compressor parallel to the plane of impeller rotation.
Figure 4B:
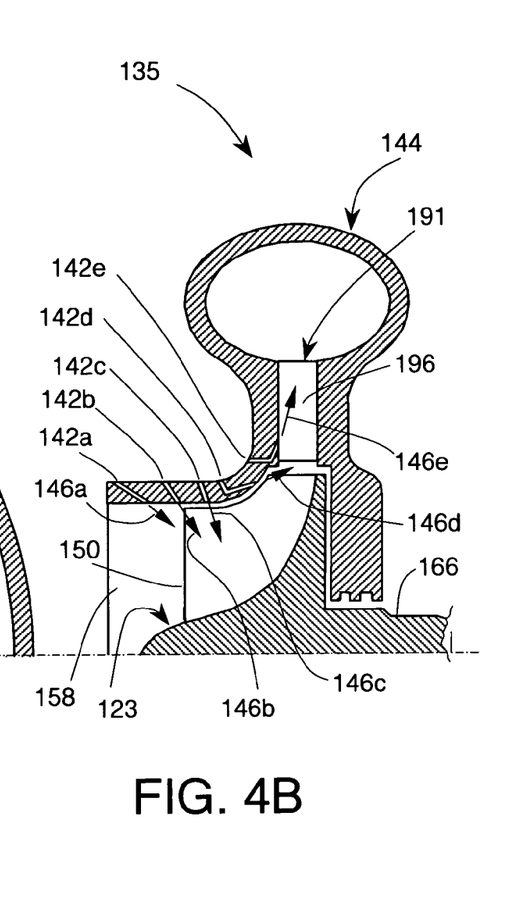
FIG. 4B is a cross-sectional view of a centrifugal compressor perpendicular to the plane of impeller rotation.

Referring now to FIGS. 4A and 4B, cold air from the air feed line 148 may be injected into the compressor housing 144 through one or more injectors 142*a* to form a jet 146*a* directed into the flow facing portion of the impeller 123 as disclosed by the above noted Sumser. If more than one injector 142*a* is used, they may be circumferentially placed in the inflow port 158. Alternatively, cold air stream from the air feed line 148 may be injected through one or more injectors 142*b* to form a jet or jets 146*b* directed upstream of the axial end side of the compressor impeller blades 150 and/or one or more injectors 142c to form a jet or jets 146c directed generally radially at the level of the compressor impeller blades 150 as disclosed by the above noted Scheinert. As a yet another alternative, cold air stream from the air feed line 148 may be injected through one or more injectors 142d to form a jet or jets 146d directed at the downstream edge of the compressor impeller blades 150 as disclosed by Bucher in U.S. Pat. No. 4,696,165. As a still another alternative, if the compressor 135 has a vaned diffuser 191, cold air stream from the air feed line 148 may be injected through one or more injectors 142e to form a jet or jets 146e directed between diffuser blades 196 and into the diffuser inlet as disclosed by the above noted Schegk. In each case, suitable openings for injecting cold air into the compressor housing may be conducive to generating subsonic flow, sonic flow, or supersonic flow. For example, the cold air injector 142a through 142e may be a subsonic, sonic or supersonic nozzle.

Referring now again to FIG. 3, during normal operation of the supercharged ICE system 10, intake air stream 32 is drawn into the turbocharger 100, passes therethrough and it is fed as an intake air stream 32" into ICE 20 where it is combusted with suitable fuel. Exhaust gas stream 92 flows from the ICE 20 through the exhaust duct 46 into the turbine 182 and it exists the turbine 182 as an exhaust gas stream 92'. When the ICE 20 operates at reduced load, the amount of exhaust gases in the exhaust stream 92 is limited and the turbocharger 162 may operate at low or moderate rotational speed. Under these conditions, the compressor 135 may generate low or insignificant compression while the engine 20 may be provided with adequate quantity of intake air. Therefore, the control valve 132 may be closed. The auxiliary compressor 164 may be operated concurrently as it may be necessary to maintain the air pressure inside the tank 160 within predetermined limits. In particular, the auxiliary compressor 164 may draw air (preferably free of dust and solid particulates) from the inflow duct 126 through the inlet line 176 and compress it to a desired pressure. Preferred output pressure of auxiliary compressor 164 is between 50 and 300 psi. As an alternative, the auxiliary compressor 164 may draw filtered air from ambient atmosphere or other suitable source. Output of the auxiliary compressor 164 is fed through the line 172 into the aftercooler 178 where the heat of compression is largely removed, and through the line 184, check valve 180 and line 186 into the air tank 160. The air tank 160 may be equipped with a pressure switch having one higher setting and one lower setting. The pressure switch may be operatively connected to the controls of the auxiliary compressor 164 (and/or to the clutch 157, if used) so that the auxiliary compressor 164 may be operated to maintain the pressure in the air tank 160 between predetermined limits. Alternatively, the auxiliary compressor 164 may be equipped with an unloader valve which automatically relieves the auxiliary compressor 164 of the pumping load when the air tank 160 is charged to a predetermined pressure. The auxiliary compressor 164 may be engaged in a smooth and/or gradual manner to avoid imposing abrupt load on its source of motive power. To avoid excessive or unnecessary power drain on the ICE 20, operation of the auxiliary compressor 164 may be restricted or prohibited during periods of high power demand on the ICE. For example, if the air tank 160 is charged to a level above a predetermined tank charge level value, operation of the auxiliary compressor 164 may be allowed only when the ICE output torque (as, for example, sensed by the torque sensor 30 or by other suitable means) is less than a predetermined ICE output torque value. As another example, if the air tank 160 is charged to a level above a predetermined tank charge level value, operation of the auxiliary compressor 164 may be allowed only when the torque in the vehicle drive shaft 48 is less than a predetermined vehicle drive shaft torque value. Such a predetermined vehicle drive shaft torque value may have a negative sign. The auxiliary compressor 164 may be also engaged in a manner which allows recovery of kinetic energy from the motion of associated automotive vehicle. For example, if the air tank 160 is charged to a level above a predetermined tank charge level value, operation of the auxiliary compressor 164 may be allowed only when vehicle brakes are applied. In this fashion, a significant portion of the vehicle kinetic energy otherwise wasted in braking may be recovered.

When the demand for output power of the ICE 20 is increased, so is the demand for intake air. At that instant, the speed of the turbocharger 162 may be relatively low and the turbocharger may have to accelerate to meet the ICE intake air demand. This condition is detected as described below and remedied by appropriately setting the pressure regulator 130 and by opening the control valve 132. As a result, the pressure regulator 130 regulates the pressure of compressed air it receives from the high-pressure supply line 138 and flows regulated compressed air at a predetermined pressure $p_1$ into the line 136. The control valve 132 and lines 136, 137, and 148 are preferably constructed to have a very low impedance to air flow. Preferably, output pressure of the pressure regulator 130 is set so that the absolute pressure $p_1$ at the vortex tube inlet 116 is at least 2.4 times greater than the absolute pressure $p_2$ inside at the cold outlet port 124. A preferred value for pressure ratio of $p_1/p_2$ is between about 2.4 and about 8. Referenced art suggests that exceeding this range may cause undesirable flow shocks inside the vortex tube 120 (see, e.g., B. K. Ahlbom, supra). With the control valve 132 in an open position, compressed air from the air tank 160 forms a stream 110 which flows through the line 137 to the inlet port 116 of the vortex tube 120. If the vortex tube shown in either FIG. 2A or 2B is used, thermodynamic action inside the vortex tube deposits heat into the tube's cooling jacket and it cools the air inside the tube. Regardless of the vortex tube style, cold air exits the vortex tube 120 through the cold outlet port 124, flows through the air feed line 148 into the compressor housing 144 via the injector 142 and it forms a jet 146.

Referring now again to FIGS. 4A and 4B, the injector 142 may be arranged in the configuration of injector 142a, 142b, 142c, 142d, and/or 142e. One or more injectors may be used for each injector configuration. In particular, cold air stream from the air feed line 148 may be injected 1) through one or more injectors 142a to form one or more jets 146a directed into the flow facing portion of the impeller 123 and/or 2) through one or more injectors 142b to form one or more jets 146b directed upstream of the axial end side of the compressor impeller blades 150 and/or 3) through one or more injectors 142c to form one or more jets 146c directed onto the compressor impeller blades 150 and/or 4) through one or more injectors 142d to form one or more jets 146d directed at the downstream edge of the compressor impeller blades 150. The impeller 123 of compressor 135 is thus cooled by contact with injected cold air and the momentum of the injected air is in-part transferred to the impeller 123, thereby accelerating its rotational speed. If the compressor 135 has a vaned diffuser 191, cold air stream from line 148 may be injected through one or more injectors 142e to form one or more jets 146e directed between the diffuser blades 196 and into the diffuser inlet. The resulting jets 142e entrain intake air in the diffuser and pump it into the intake duct 26. Cold air injected through any of the injectors 142a through 142e is mixed with the intake air stream 32 and, as a result, cooler and denser air is delivered into the intake duct 26. Air flowing through the intake duct 26 may be further cooled by the intercooler 168 prior to being delivered the combustion chambers of ICE 20. Increased quantity of air available for combustion allows ICE 20 to generate more output power and greater quantity of exhaust gases in the exhaust gas stream 92 which, in turn, operates the turbine wheel 170 and allows it to further accelerate in rotational speed.

Under typical driving conditions the periods of high-power demand on the ICE 20 are relatively short and (depending on vehicle driving conditions) may occur on the average only about 10% of the vehicle operating time. This means that the conditions requiring the turbocharger 100 to accelerate may be discontinuous and air from the air tank 160 may be discharged in an intermittent mode. For example, the ICE may operated in a supercharged mode for about 10% of the vehicle operating time. This may leave on the average about 90% of the vehicle operating time available for recharging the air tank 160.

At any time during the ICE operation, the ECU 194 may monitor one or more operating parameters of the ICE system 10 and regulate the mass flow rate of air through the vortex tube 120 by operatively controlling the pressure regulator 130 and the valve 132 according to predetermined conditions. Operating parameters monitored by the ECU 194 may include engine rotational speed, turbocharger rotational speed, engine output torque, fuel flow rate, vehicle speed, throttle opening (if throttle is used), and position of accelerator pedal. Other useful parameters monitored by the ECU may include ambient air pressure and temperature, intake air mass flow rate, and intake air pressure and temperature. The engine output torque value can be either directly measured (for example, the torque value can be the detection value of the torque sensor 30) or it can be inferred from other ICE parameters. In particular, it is well known that engine torque value can be estimated from one or more ICE parameters including intake air mass flow rate, spark timing, or combustion chamber pressure data as noted, for example, by T. Jaine et al. in "High-Frequency IMEP Estimation and Filtering for Torque-Based SI Engine Controls," SAE paper number 2002-01-1276, published by the Society of Automotive Engineers, Inc., Warrendale, Pa. Alternatively to using an ECU with a central processing unit, various electrical, mechanical, electromechanical, hydraulic, and/or pneumatic control mechanisms may be used to operate the valve 132 and the pressure regulator 130 in response to predetermined conditions. It will be apparent to those skilled in the art from this disclosure that the precise structure and algorithms for the ECU can be any combination of hardware and software that will carry out the functions of the present invention.

There is a variety of processes the ECU 194 may employ for controlling the operation of the turbocharger 100. Preferably, the ECU repeatedly obtains and stores detection values of various sensors which may be processed to determine the state of ICE system 10. Such sensors may include, but are not limited to ICE rotational speed, turbocharger rotational speed, position of accelerator pedal, throttle opening, fuel flow rate, vehicle speed, ICE output torque, air velocity in the intake duct 26, air pressure in the line 137, setting of the pressure regulator 130, position of the control valve 132, air pressure and temperature in the intake duct 126, air pressure and temperature in ICE intake duct 26, ambient air pressure and temperature, and pressure and temperature of exhaust gases in the exhaust duct 46. The ECU 194 may be configured to increase the mass flow of cold air into the compressor housing 135 if simultaneously the turbocharger rotational speed value is less than a predetermined turbocharger rotational speed value and the ICE torque value is more than a predetermined ICE torque value. Accordingly, the ECU 194 may be configured to decrease the mass flow of cold air into the compressor housing 144 if simultaneously the turbocharger rotational speed value is more than a predetermined turbocharger rotational speed value and the ICE torque value is less than a predetermined ICE torque value.

Figure 5A:
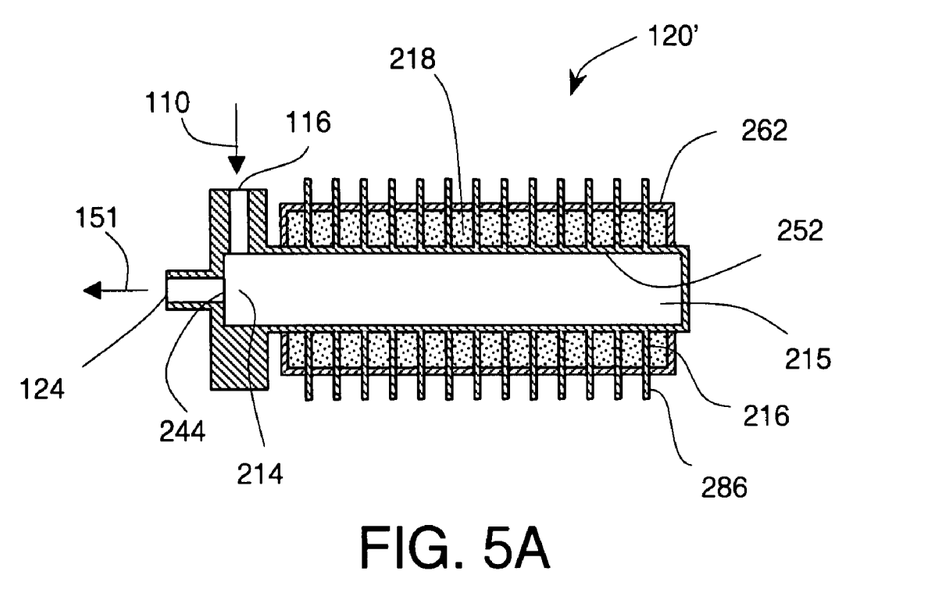
FIG. 5A is a cross-sectional view of a vortex tube adapted for generation of cold output stream only while rejecting heat into a phase change material (PCM).
Figure 5B:
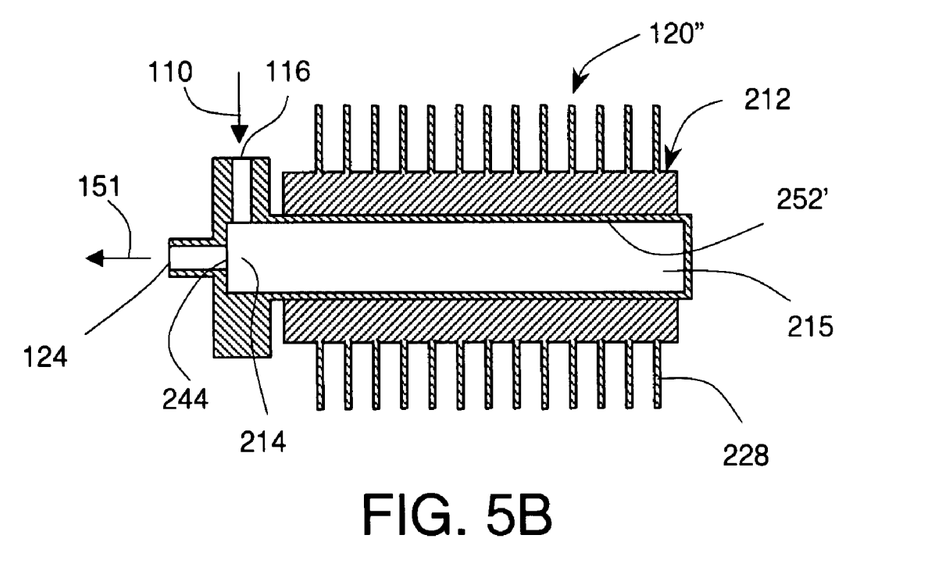
FIG. 5B is a cross-sectional view of a vortex tube adapted for generation of cold output stream only while rejecting heat into a ballast structure.

FIGS. 5A and 5B respectively show alternative vortex tubes 120' and 120" suitable for use with the subject invention. Referring now to FIG. 5A, the vortex tube 120' comprises a tubular body 252 having two ends 214 and 215 opposite to each other. The first end 215 is entirely closed. The second end 214 is partially closed and has a central opening 244 leading to a cold outlet port 124. An inlet port 116 for compressed air is installed in proximity of the second end 214. The tubular body 252 is preferably constructed from a material with high thermal conductivity such as copper, copper alloys, aluminum and aluminum alloys. Exterior of the tubular body 252 is substantially surrounded by a cooling jacket 262 filled with phase change material (PCM) 218. Suitable PCM may include stearin which is known to have a transition temperature in the range of 50-70 degrees Centigrade and certain fusible metals such as Wood's metal which is known to have a transition temperature around 70 degrees Centigrade or Field's metal which is known to have a transition temperature around 62 degrees Centigrade. The vortex tube 120' may also include cooling fins 216 attached to the exterior surface of tubular body 252. Suitable cooling fins are preferably made of material with high thermal conductivity and are in a good thermal contact with each the tubular body 252 and the PCM 218. In one embodiment, the cooling fins 216 may extend radially so as to protrude through the cooling jacket 262 (as shown in FIG. 5A). Tip portions 286 of cooling fins 216 may be in a thermal communication with a cooling fluid which may be a gas such as air or a liquid such as engine cooling fluid.

The vortex tube 120' is suitable for operation in two modes: 1) a cooling mode and 2) a thermal recovery mode. At the beginning of the cooling mode, the PCM 218 is substantially in a solid form. Compressed air stream 110 at an initial pressure and temperature is injected through the inlet port 116 tangentially into the interior of the tubular body 252 where it forms a vortex flow pattern in a manner already described in connection with FIGS. 1, 2A and 2B. Furthermore, the injected air is cooled and it forms a cold air stream 151 having reduced temperature and pressure. The cold air stream 151 exits the vortex tube 120' through the central opening 244 leading to the cold outlet port 124. The vortex flow deposits heat into the tubular body 252. The tubular body 252 further conducts the heat with the aid of the cooling fins 216 into the PCM 218 and causes it to gradually melt. When the PCM 218 is substantially melted, the cooling mode may be terminated, the flow of compressed air stream 110 is stopped, and the thermal recovery mode may be initiated. In the thermal recovery mode of operation, heat stored in the PCM 218 may be removed from the vortex tube 120' by conducting it through the cooling fins 216 to a coolant in thermal communication with the tip portions 286. When the PCM 218 has been substantially transformed back into solid form, the thermal recovery mode of operation may be concluded and the vortex tube 120' may be ready for operation in the cooling mode.

The vortex tube 120" shown in FIG. 5B uses a heat ballast structure 212 to store thermal energy as sensible heat. The ballast structure 212 is preferably made of material having high thermal conductivity, such as aluminum alloys or copper and it is placed in a good thermal communication with the tubular body 252'. Furthermore, the ballast structure 212 may include fins 228. In some variants of the invention, the ballast structure 212 and the tubular body 252' may be formed as a single component. The vortex tube 120" is suitable for operation in two modes: 1) a cooling mode and 2) a thermal recovery mode. At the beginning of the cooling mode, the temperature of the ballast structure 212 is less than a predetermined ballast lower temperature value. As the vortex tube 120" cools injected compressed air, the tubular body 252' conducts heat to the ballast structure 212 causing it to gradually heat up. When the temperature of the ballast structure 212 reaches a predetermined ballast upper temperature value, the cooling mode may be terminated, the flow of compressed air stream 110 may be stopped, and the thermal recovery mode may be initiated. In the thermal recovery mode of operation, heat stored in the ballast structure 212 may be removed from the vortex tube 120" by conducting it through the cooling fins 228 to a coolant in thermal communication with the cooling fins. When the temperature of the ballast structure 212 becomes less than a predetermined ballast lower temperature value, the thermal recovery mode of operation may be concluded and the vortex tube 120" may be ready for operation in the cooling mode. As already noted, the cooling fins of the vortex tubes 120' and 120" may be cooled by air. If the ICE 20 is water cooled and it has a radiator with a fan that induces air into the radiator, or if the ICE 20 is air cooled and it has a fan that induces air over the engine, the vortex tube may be placed so that it may receive a part of the air flow induced by the fan. If the ICE is used in a vehicle, the vortex tube 120' or 120" may be exposed to vehicle slipstream air and be cooled by it.

Figure 6:
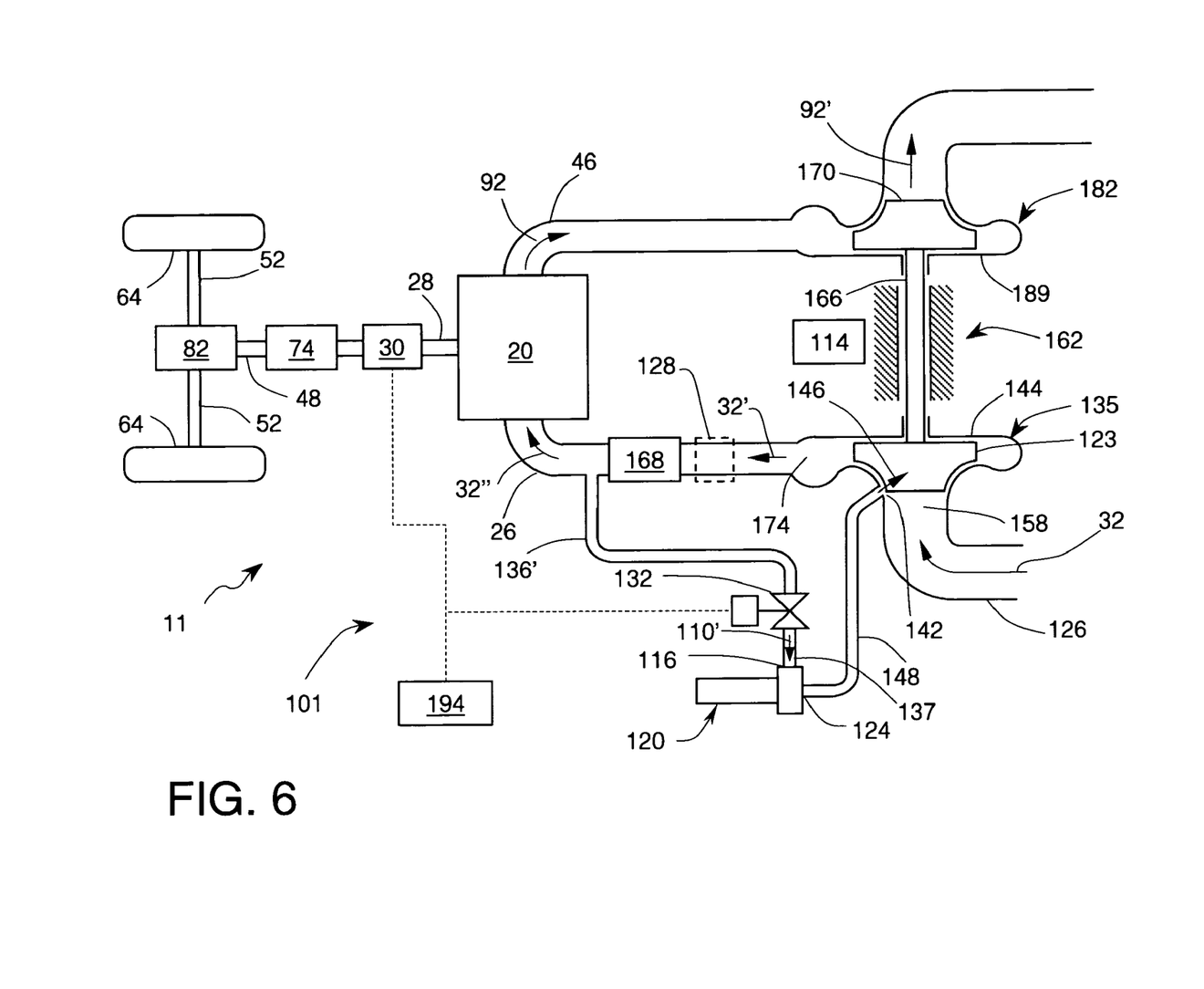
FIG. 6 is a schematic view of a turbocharged ICE system in accordance with another embodiment of the subject invention.

Referring now to FIG. 6, there is shown a turbocharged ICE system 11 in accordance with another embodiment of the subject invention which is particularly suitable for turbochargers with high compression ratio and for substantially continuous operation. The ICE system 11 comprises a turbocharger assembly 101 which is essentially the same as the turbocharger assembly 100 except that the source of compressed air for operation of the vortex tube 120 in this embodiment may be the compressor 135. Furthermore, the pressure regulator 130 may not be used. In particular, the inlet port 116 of vortex tube 120 is fluidly coupled to the intake duct 26 by means of the line 136'. The line 136' is fluidly connected to the intake duct 26 preferably downstream of the intercooler 168 (if intercooler is used). The compressor 135 used in this embodiment should be capable for generating sufficiently high pressure ratio to operate the vortex tube 120. Preferably, the compressor pressure ratio is at least 2.4. Alternatively, a second compressor 128 (shown in broken line) may be placed in series with and downstream of the compressor 135. In such case, the line 136' is preferably arranged to receive compressed air generated by the second compressor 128. The injector 142 may be configured in the form of an injector 142a, 142b, 142c, and/or 142d as shown in FIGS. 4A and 4B and already described in connection therewith. The control valve 132 may be configured upstream of the vortex tube 120 (as shown in FIG. 6) or down stream of it (in line 148). In either case, the control valve 132 may be adapted for substantially smooth control of mass flow rate of cooled air to the injector 142. If desirable, the air feed line 148 may be branched out and separate control valves may be configured on each branch to independently control delivery of cold air from the vortex tube 120 to the injectors 142a, 142b, 142c, and/or 142d.

In operation, compressor 135 may receive intake air stream 32, compress it to generate compressed intake air stream 32' which may be compressed again by the second compressor 128 (if used) and feed it to the intercooler 168 thereby producing an intake air stream 32" which may be then fed to the ICE 20. Intake air may be combusted with suitable fuel in ICE 20 thereby generating an exhaust gas stream 92 which may be fed to the turbine 174 to spin the turbine wheel 170, which in turn may spin the impeller 123 of compressor 135. When injection of cold air into the housing 144 of compressor 135 is desired, the valve 132 may open at least partially and a portion of the intake air stream 32" may be allowed to flow into the line 136', through the control valve 132 and into the line 137, thereby forming a compressed air stream 110'. The air stream 110' may flow through the inlet port 116 into the vortex tube 120 where it may be at least in-part cooled and then fed through the air feed line 148 into the housing 144 of compressor 135. The turbocharger assembly 101 is particularly suitable for use with a turbocharger 162 having a compressor capable of generating high output pressure or an ICE system having multiple charge compressor stages. The turbocharger assembly 101 is also particularly suitable for substantially continuous operation whenever the pressure in the intake duct 26 is sufficient to operate a vortex tube.

Figure 7:
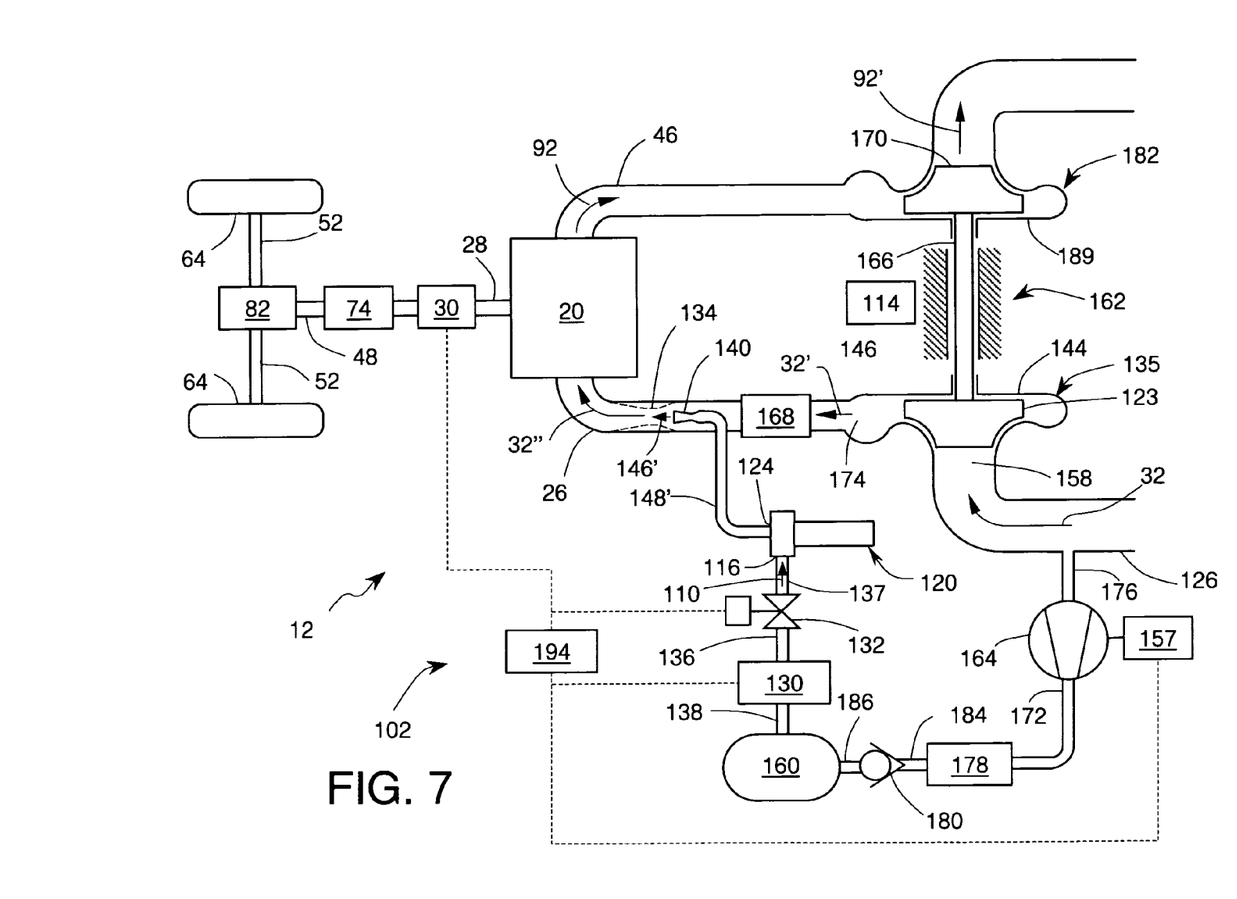
FIG. 7 is a schematic view of a turbocharged ICE system in accordance with yet another embodiment of the subject invention.

Referring now to FIG. 7, there is shown a supercharged ICE system 12 in accordance with a yet another embodiment of the subject invention and having additional capability to provide dense intake air during periods of increasing power demand on the ICE 20. The ICE system 12 comprises a turbocharger assembly 102 which is similar to the turbocharger assembly 100 except that the cold outlet port 124 of the vortex tube 120 is connected by the air feed line 148' to the intake duct 26 rather than to the compressor housing 144. Furthermore, the air feed line 148' is preferably terminated inside the intake duct 26 with a driving nozzle 140 which is arranged to inject air in the general direction of the intake air stream 32". One driving nozzle or several driving nozzles configured in parallel may be used. Suitable types of driving nozzles include a simple orifice, a subsonic nozzle, a sonic nozzle, supersonic nozzle, converging-diverging nozzle, and a lobed nozzle. Several configuration of a suitable supersonic nozzle are disclosed in the already noted Applicant's co-pending U.S. patent application Ser. No. 11/389,795. Preferred nozzle types include a converging-diverging nozzle which is conducive to generating supersonic flow and/or a lobed nozzle which is known for its good mixing characteristics. Note that a lobed nozzle may be operated in a supersonic flow regime. The nozzle 140 may also have a variable throat area for control of mass flow rate therethrough. Examples of suitable variable area driving nozzles have been disclosed in Applicant's U.S. Pat. No. 7,076,952 and the already noted co-pending U.S. patent application Ser. No. 11/655,441. To operate the driving nozzle 140 in the supersonic regime, the nozzle pressure ratio (=pressure in the line 148'/pressure in the intake duct 26 downstream of the nozzle) should be at least about 1.9. In addition, the flow rate and pressure of air fed in the line 137 into the inlet port 116 of vortex tube 120 should be properly selected so that the ratio of pressure at the vortex tube inlet 116 to the pressure at the cold outlet port 124 is maintained preferably between about 2.4 and about 8 as already stated above.

In operation, when the ICE 20 is experiencing increasing power demand and the turbocharger 162 rotates at a speed insufficient to provide adequate amount of intake air to the ICE, the control valve 132 may open and cold air from the vortex tube 120 may be injected through the driving nozzle 140 into the intake duct 26. The driving nozzle 140 generates a high velocity jet 146' of cold air, which mixes with and entrains the intake air inside the intake duct 26, and forces the intake air toward the ICE 20. Kinetic energy of the flow downstream of the nozzle 140 is gradually converted into a potential (pressure) energy. As a result, intake air pressure inside the intake duct 26 downstream of the nozzle 140 is greater than the pressure upstream of the nozzle 140, and the air temperature downstream of the nozzle 140 is lower than the temperature upstream of the nozzle 140. Another words, injection of cold high-velocity air through the nozzle 140 increases the density of intake air fed to the combustion chamber of ICE 20 by a combination of compression and cooling. Cold air injection into the intake duct 26 may be also initiated whenever 1) the temperature of intake air downstream of the intercooler 168 exceeds a predetermined intake air temperature value, or 2) whenever the temperature of exhaust gas stream 92 exceeds a predetermined exhaust gas stream temperature value and the engine speed is less than a predetermined engine speed value, or whenever 3) the rate of temperature increase of intake air downstream of the intercooler 168 exceeds a predetermined rate of temperature increase of intake air value and the engine speed is less than a predetermined engine speed value, or 4) whenever the rate of increase of exhaust gas stream 92 temperature exceeds a predetermined rate of increase of exhaust gas stream 92 temperature value and the engine speed is less than a predetermined engine speed value.

A portion of the intake duct 26 in the vicinity of the nozzle 140 may be formed into a venturi shaped diffuser duct 134 indicated in broken line in FIG. 7. Such an arrangement enhances the capability of the nozzle 140 to pump intake air. The diffuser duct 134 preferably has a circular cross-section which is known for its low wall friction losses. However, other cross-sections including oval, ellipse, square, rectangle, polygonal shape, and alike may be also used. The diffuser duct 134 preferably has an upstream converging section, which may be followed by a straight middle section that is followed by a downstream divergent section. It should be noted that the nozzle 140 together with the venturi shaped diffuser duct 134 may be regarded as an ejector. Performance of such an ejector, namely its throughput and compression ratio depend (among other things) on the configuration of the nozzle 140 and of the diffuser 134. For an ejector used in ICE supercharging application, it is desirable that the ejector (a) is capable of producing a compression ratio comparable to mechanical superchargers and turbochargers, namely at least about 1.3 and preferably at least about 1.5, (b) presents relatively low impedance to intake air flow when the ejector is not operating, and (c) is compact. Compactness is very important in automotive applications, especially in passenger automobiles, where the space in the engine compartment is very limited. In a practical sense, compactness of the ejector is mainly affected by the length of the diffuser duct. The above desirable attributes may be in mutual conflict because improving one may make it more challenging to meet the others. For example, to avoid undesirable detachment of flow from the diffuser wall, the walls of the diverging portion of the diffuser may be sloped at a very small angle (typically not exceeding about 4 degrees) with respect to the nominal flow direction. The length of the diffuser duct thus increases with the increasing transverse dimension (e.g., diameter) of the diffuser duct throat. One may increase the transverse dimension of a diffuser duct throat and thus beneficially reduce its impedance to intake air flow when the ejector is not operating (assuming that such flow passes through the ejector). However, a diffuser duct with a larger throat may make it more challenging to obtain a desired compression ratio. The approaches to making the ejector acceptably compact (short) while achieving acceptably high compression and acceptably low impedance to intake air flow may include: 1) use of lobed driving nozzle, 2) use of multiple driving nozzles, 3) use of multiple parallel ejectors, 4) use of a variable area diffuser, and 5) use of an ejector bypass duct. These will be now described in detail.

1) Lobed nozzles have been developed in aeronautics to improve mixing of the surrounding air with the high velocity jet produced by jet engines. Lobed nozzles may be operated either in a subsonic or supersonic regime. Suitable lobed nozzle is described in connection with jet engine design in a variety of technical publications including, for example, in "Parameter Effects on Mixer-Ejector Pumping Performance" by S. A. Skebe et al., paper number AIAA-88-0188 and in "Short Efficient Ejector Systems" by W. Pretz, Jr. et al., paper number AIAA-87-1837, both of which are available from the American Institute of Aeronautics and Astronautics, Washington, D.C., and in "Supersonic Nozzle Mixer Ejector," by T. G. Tillman et al. published in Journal of Propulsion and Power, Volume 8, Number 2, March-April 1992, pages 513-519, and "Supersonic-Ejector Characteristics Using Petal Nozzle," by A. K. Narayanan et al., published in Journal of Propulsion and Power, Volume 10, Number 5, September-October 1994, pages 742-744. The use of lobed nozzle in ejectors for ICE supercharging of has been disclosed by the Applicant in the already noted U.S. Pat. No. 7,076,952. The use of lobed driving nozzle may allow constructing a supercharging ejector with a substantially shorter diffuser than a comparable ejector with a single non-lobed driving nozzle. If the throat area of an associated diffuser duct is made about 25 to about 50 times the throat area of the corresponding lobed driving nozzle, the diffuser duct should have an acceptable impedance to intake air flow when the ejector is not operating. However, this condition may make it more challenging to obtain a desired compression ratio.

2) Ejector with multiple nozzles: An ejector having multiple driving nozzles discharging into one diffuser (as disclosed by the Applicant in the already noted U.S. Pat. No. 7,076,952) may be also made substantially (generally about 30%) shorter than a comparable ejector having a single nozzle without excessive degradation in performance. If the throat area of an associated diffuser duct is made about 25 to about 50 times the sum of the throat areas of the corresponding multiple driving nozzles, the diffuser duct should have an acceptable impedance to intake air flow when the ejector is not operating. However, this condition may make it more challenging to obtain a desired compression ratio.

3) Multiple parallel ejectors: Instead of one larger capacity (and comparably longer) ejector, one may use several smaller capacity (and comparably shorter) ejectors fluidly connected in parallel as disclosed by the Applicant in the already noted co-pending U.S. patent application Ser. No. 11/389,795. If for each of the smaller ejectors the throat area of an associated diffuser duct is made about 25 to about 50 times the throat area of the corresponding driving nozzle, the combination of parallel diffuser ducts should have an acceptable impedance to intake air flow when the ejector is not operating. However, this condition may make it more challenging to obtain a desired compression ratio.

4) The diffuser duct 134 may be also constructed as a variable area diffuser duct as disclosed by the Applicant in the already noted co-pending U.S. patent application Ser. No. 11/389,795. When the nozzle 140 injects high-velocity air into the variable area diffuser duct, the throat area of diffuser duct 134 may be set to between about 2 to about 25 times the throat area of the driving nozzle 140 (or the combined throat areas of multiple driving nozzles if multiple driving nozzles are used) to achieve high compression. In particular, the throat area of a variable area diffuser duct is preferably set to 3 to 15 times (and most preferably to 5 to 10 times) the throat area of the driving nozzle (or the combined throat areas of multiple driving nozzles if multiple driving nozzles are used). When the nozzle 140 is not operating, the throat area of the variable diffuser duct may be set to more than about 25 times (and preferably more than 50 times) the area of the driving nozzle 140 (or the combined throat areas of multiple driving nozzles if multiple driving nozzles are used) to achieve acceptable impedance to intake air flow.

Figure 8:
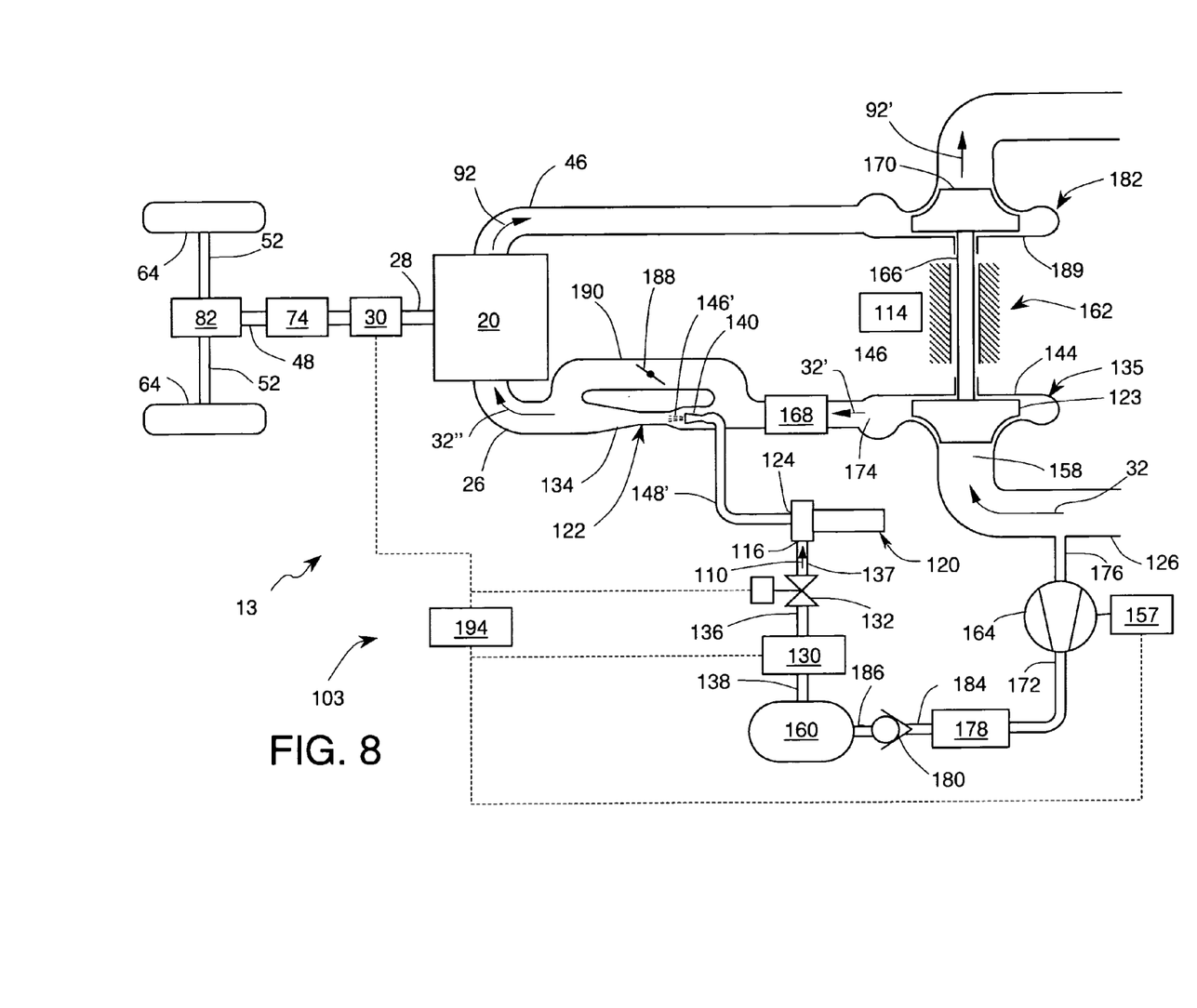
FIG. 8 is a schematic view of a turbocharged ICE system in accordance with still another embodiment of the subject invention.

4) Ejector bypass duct. A bypass duct offers a convenient low impedance means for flowing at least a portion of intake air when the ejector is not operating. Referring now to FIG. 8, there is shown a supercharged ICE system 13 in accordance with a still another embodiment of the subject invention and having additional capability to provide dense intake air during periods of increasing power demand on the ICE 20. The ICE system 13 comprises a turbocharger assembly 103 which is essentially the same as the supercharger assembly 102 except that nozzle 140 and the diffuser duct 134 are now a part of an ejector pump 122. In addition, the turbocharger assembly 103 includes a bypass duct 190, which allows the flow of intake air from the compressor 135 to bypass the ejector pump 122. The bypass duct 190 includes a bypass valve 188 for control of intake air passing therethrough. The ejector pump 122 may be practiced with multiple driving nozzles injecting high-velocity jet into a single diffuser duct. Alternatively, several ejector pumps 122 may be used in parallel. As another alternative, one or more lobed driving nozzles may be used. The driving nozzle 140 may be also a variable area nozzle. Regardless of the driving nozzle configuration, the throat area of diffuser duct 134 may be made between about 2 to about 25 times the throat area of the driving nozzle 140 (or the combined throat areas of multiple driving nozzles if multiple driving nozzles are used) to achieve high compression. In particular, the throat area of the diffuser duct 134 is preferably made 3 to 15 times (and most preferably 5 to 10 times) the throat area of the driving nozzle (or combined throat area of multiple driving nozzles if multiple driving nozzles are used). Three Penberthy ejectors model numbers GL-½, GL-¾, and GL-1¼" (made by Penberthy Inc., Prophetstown, Ill.) with the throat areas of the diffuser ducts respectively being about 7.2 times, 7.5 times, and 6.3 times the throat areas of their respective driving nozzles were tested and showed acceptable compression and pumping performance.

The bypass valve 188 may be formed as a check valve that closes automatically whenever the pressure downstream of the ejector 122 significantly exceeds the pressure upstream of the ejector 122. Alternatively, the bypass valve 188 may an actuated valve of a suitable type (e.g., gate valve, poppet valve, damper valve, or a butterfly valve) operated by the ECU 194. For example, the ECU 194 may close the bypass valve 188 whenever the mass flow through the driving nozzle 140 exceeds a predetermined mass flow value. Conversely, the ECU 194 may open the bypass valve 188 whenever the mass flow through driving nozzle 140 is below a predetermined mass flow value. If the valve 188 is an actuated valve, its closing and opening rate can be coordinated with the value of mass flow rate of air through nozzle 140 to produce a substantially smooth variation in air density at the ICE intake passage 26. This approach is intended to avoid undesirably abrupt changes in ICE power output. Suitably precise control of valve 188 may be accomplished, for example, by actuating the valve 188 by a stepping motor. In operation, when it is not desirable to flow cold air through nozzle 140 the control valve 132 may be closed. Concurrently, the bypass valve 188 may be in an open position and intake air may flow primarily through the bypass duct 190. When injection of cold air through nozzle 140 is desired, the control valve 132 may be open, the ejector pump 122 may be operated and the bypass valve 188 may be closed.

It will be appreciated that the present invention can be implemented with a variety of ICE of either reciprocating type or rotary type. The ICE can have any number of combustion chambers. Features of the various embodiments may be combined in any suitable manner. The turbocharger assembly 100, 101, 102, and 103 may be practiced with any type of a compressor 135 having an impeller 123, including a turbocompressor driven by an exhaust gas turbine or by an electric motor. The compressor 135 may have a radial or axial configuration. The turbocharger assembly 102 and 103 may be also practiced with the compressor 135 replaced by a suitable mechanical compressor including a Roots pump, screw compressor and a scroll compressor, or the turbocharger assembly may be practiced without the compressor 135.

An ICE system may be also incorporate several combined embodiments the turbocharger assembly of the subject invention and such embodiments may be activated according to predetermined conditions. For example, in response to increasing power demand and with the turbocharger 162 providing insufficient intake air, an ICE system may be initially configured in accordance with the turbocharger assembly 102 or 103, wherein compressed air from an auxiliary source of compressed air is cooled in a vortex tube 120 and the resulting cold air injected into the intake duct 26. After the injection of cold air into the intake duct 26 has been initiated, the ICE system may be configured in accordance with the turbocharger assembly 100, wherein compressed air from an auxiliary source of compressed air is cooled in the vortex tube 120 and the resulting cold air injected into the compressor housing 144 where it may be used to favorably shift the surge limit, and/or to accelerate the rotational speed of compressor impeller 123, and/or to cool the impeller blades 150, and/or to produce pumping action in the diffuser 191 (if the diffuser is present). Once the compressor 135 has reached its normal operating rotational speed range, the ICE system may be configured in accordance with the turbocharger assembly 101, wherein a portion of the compressed intake air stream downstream of the compressor 135 is separated, cooled in the vortex tube 120 and injected into the compressor housing 144 where it may be used to favorably shift the surge limit, and/or accelerate the rotational speed of compressor impeller 123, and/or to cool the impeller blades 150, and/or to produce pumping action in the diffuser 191 (if the diffuser is present).

The term "intake air" used in this application should be give an broad interpretation so as to include presence of ICE fuel and ICE exhaust gases. Thus, intake air is essentially a mixture of nitrogen, oxygen, carbon dioxide, water vapor, and inert gases, and may also include ICE fuel vapor, nitrogen oxides, and hydrocarbons. In some embodiments of the invention the compressed air for operation of the vortex tube may be derived from the intake air, therefore, the composition of the compressed air may be essentially the same as that of the intake air.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A method for operating a supercharged internal combustion engine (ICE) comprising the acts of:
    providing an ICE having a combustion chamber;
    providing an intake duct configured for flowing intake air into said combustion chamber;
    providing a compressor having a housing and an impeller rotatably mounted inside said housing, said housing including an inflow port and an outflow port, said outflow port being fluidly connected to said intake duct;
    providing a vortex tube having an inlet port and a cold outlet port;
    providing a compressed air supply;
    operating said ICE;
    flowing compressed air from said compressed air supply into said inlet port of said vortex tube;
    producing a vortex air flow inside said vortex tube;
    separating hot and cold portions of said vortex air flow; and
    flowing said cold portion of air flow from said cold outlet port of said vortex tube to a location selected from the group consisting of said intake duct and said compressor housing.

2. The method for operating a supercharged ICE as in claim 1 further comprising the acts of:
    providing a control unit for receiving output load of the ICE and the rotational speed of the compressor in order that the control unit regulates the flow of said cold portion of air flow;
    sensing ICE output load;
    sensing the rotational speed of said compressor; and
    varying the flow of said cold air in accordance with ICE output load and rotational speed of said compressor.

3. The method for operating a supercharged ICE as in claim 1 wherein said act separating hot and cold portions of said vortex air flow further comprises transferring heat from said hot portion of said vortex flow to a medium selected from the group consisting of air, engine coolant, ballast structure, and phase change material.

4. The method for operating a supercharged ICE as in claim 1 wherein said act of flowing cold air from said cold outlet port of said vortex tube to said intake duct further comprises flowing said cold air through a driving nozzle to pump said intake air.

5. The method for operating a supercharged ICE as in claim 1 wherein said act of flowing cold portion of air flow from said cold outlet port of said vortex tube to said compressor housing further comprises directing cold air to a portion of said impeller selected from the group consisting of the flow-facing region of the impeller and impeller blades.

6. The method for operating a supercharged ICE as in claim 1 wherein said compressed air source is selected from the group consisting of an auxiliary source of compressed air and said intake duct; and further comprising the acts of:
    flowing compressed air from said auxiliary source of compressed air to said vortex tube while flowing said cold air from said cold outlet port of said vortex tube into said intake duct; followed by
    flowing compressed air from said auxiliary source of compressed air to said vortex tube while flowing said cold air from said cold outlet port of said vortex tube into said compressor housing; and followed by
    flowing compressed air from said intake duct to said vortex tube while flowing said cold air from said cold outlet port of said vortex tube into said compressor housing.

7. An internal combustion engine system comprising
    an internal combustion engine;
    an exhaust-gas turbocharger comprising a turbine and a centrifugal compressor, which are both arranged on a common shaft, said turbine being driven by exhaust gases from said engine; said compressor adapted for compressing intake air and for delivering compressed intake air through an intake duct to said engine; and
    a vortex tube having an inlet port fluidly connected to an auxiliary source of compressed air, said vortex tube having a cold outlet port fluidly connected to said intake duct; said vortex tube being adapted for receiving compressed air from said auxiliary source of compressed air through said inlet port and discharging a flow of cold air through said cold outlet port; and said vortex tube being adapted for flowing said cold air into said intake duct.

8. The internal combustion engine system as in claim 7 wherein said cold air from said vortex tube is flowing into said intake duct through a driving nozzle.

9. The internal combustion engine system as in claim 7 further comprising an ejector in said intake duct, said ejector having a driving nozzle being adapted for receiving said cold air flowing from said vortex tube into said intake duct, and said ejector being adapted for compressing intake air prior to delivery to said engine.

10. A turbocharged internal combustion engine system comprising:
    an internal combustion engine (ICE), a vortex tube, a flow control means, an electronic control unit (ECU), and an exhaust gas turbocharger;
    said ICE having at least one combustion chamber;
    said turbocharger comprising a turbine and a compressor, which are both arranged on a common shaft; said compressor including a housing; said compressor including an impeller driven by said turbine; said impeller being rotatably mounted inside said housing; said compressor being arranged for compressing intake air and providing compressed intake air to said combustion chamber;
    said housing including at least one injector;
    said vortex tube having an inlet port fluidly coupled to a source of compressed air;

said vortex tube having a cold outlet port fluidly connected to said injector;

said flow control means for regulating the mass flow rate through said injector;

said ECU operatively coupled to said flow control means; and said ECU being configured to increase said mass flow rate through said injector when the rotational speed of said turbocharger is less than a predetermined turbocharger rotational speed value and the output torque of said ICE is more than a predetermined ICE output torque value.

11. A turbocharged internal combustion engine system comprising:

- an internal combustion engine (ICE), a vortex tube, a flow control means, an electronic control unit (ECU), and an exhaust gas turbocharger;
- said ICE having at least one combustion chamber;
- said turbocharger comprising a turbine and a compressor, which are both arranged on a common shaft; said compressor including a housing; said compressor including an impeller driven by said turbine; said impeller being rotatably mounted inside said housing; said compressor being arranged for compressing intake air and providing compressed intake air to said combustion chamber;
- said housing including at least one injector;
- said vortex tube having an inlet port fluidly coupled to a source of compressed air;
- said vortex tube having a cold outlet port fluidly connected to said injector;
- said flow control means for regulating the mass flow rate through said injector;
- said ECU) operatively coupled to said flow control means; and
- said ECU being configured to decrease said mass flow rate when the rotational speed of said turbocharger is more than a predetermined turbocharger rotational speed value and the output torque of said ICE is less than a predetermined ICE output torque value.

12. A supercharged internal combustion engine, comprising:

- an internal combustion engine having a combustion chamber;
- a supercharger compressor having a housing with an inflow port and an outflow port; said outflow port being fluidly connected to said combustion chamber and adapted for flowing intake air thereto;
- an impeller rotatably mounted in said housing which receives intake air from said inflow port and discharges compressed intake air through said outflow port;
- said housing further comprising at least one injector;
- a vortex tube having an inlet port fluidly connected to a source of compressed air; said vortex tube having a cold outlet port fluidly connected to said injector; and
- an intake duct for flowing said compressed intake air to said combustion chamber and an additional compressor;
- wherein said additional compressor is configured downstream of said supercharger compressor and arranged to further compress said compressed intake air; and
- wherein said source of compressed air is selected from the group consisting of said supercharger compressor, said additional compressor, said intake duct, an auxiliary compressor, and an air tank.

* * * * *